(12) United States Patent
Kainaga et al.

(10) Patent No.: US 10,043,621 B2
(45) Date of Patent: Aug. 7, 2018

(54) GAS INSULATED SWITCHGEAR

(71) Applicant: MITSUBISHI ELECTRIC CORPORATION, Chiyoda-ku (JP)

(72) Inventors: Soichiro Kainaga, Tokyo (JP); Manabu Yoshimura, Tokyo (JP); Takao Tsurimoto, Tokyo (JP); Shinichiro Nakauchi, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/122,867

(22) PCT Filed: Oct. 2, 2014

(86) PCT No.: PCT/JP2014/076414
§ 371 (c)(1),
(2) Date: Aug. 31, 2016

(87) PCT Pub. No.: WO2015/136753
PCT Pub. Date: Sep. 17, 2015

(65) Prior Publication Data
US 2017/0069448 A1    Mar. 9, 2017

(30) Foreign Application Priority Data

Mar. 12, 2014  (JP) .................. 2014-049021

(51) Int. Cl.
*H01H 33/56* (2006.01)
*H01H 33/64* (2006.01)
*H02G 5/06* (2006.01)

(52) U.S. Cl.
CPC ............ *H01H 33/56* (2013.01); *H01H 33/64* (2013.01); *H02G 5/065* (2013.01)

(58) Field of Classification Search
CPC ........ H01H 33/56; H01H 33/64; H01H 33/24; H01H 33/161; H01H 33/02; H02G 5/065; H02B 13/045; H02B 13/055; H01B 3/16
(Continued)

(56) References Cited

U.S. PATENT DOCUMENTS 8,530,773 B2 * 9/2013 Yoshitomo ............. B29C 70/22
                                                          218/18
8,546,687 B2 * 10/2013 Tsurimoto ............. H02G 5/065
                                                          174/28
(Continued)

FOREIGN PATENT DOCUMENTS

DE   100 09 474 C1   5/2001
EP   2 405 550 A1    1/2012
(Continued)

OTHER PUBLICATIONS

International Search Report dated Nov. 4, 2014, in PCT/JP2014/076414 filed Oct. 2, 2014.
(Continued)

*Primary Examiner* — Renee Luebke
*Assistant Examiner* — William Bolton
(74) *Attorney, Agent, or Firm* — Oblon, McClelland, Maier & Neustadt, L.L.P.

(57) ABSTRACT

A non-linear resistance film including an insulating material and a non-linear resistance material is provided on an inner surface of a grounded tank. The non-linear resistance film is formed to contain a larger amount of the non-linear resistance material on a side of a central conductor than on a side of the grounded tank. Accordingly, a gas insulated switchgear that can suppress partial discharge around metallic foreign matters and also can suppress inflow of charges from the grounded tank to the metallic foreign matters can be provided.

11 Claims, 8 Drawing Sheets

(58) Field of Classification Search
USPC ............. 218/155, 79, 80; 174/14 R; 361/311
See application file for complete search history.

(56) References Cited

U.S. PATENT DOCUMENTS

| | | | | |
|---|---|---|---|---|
| 9,508,507 | B2* | 11/2016 | Yoshimura | ............... H02G 5/06 |
| 2011/0299227 | A1* | 12/2011 | Kisanuki | ............... H02G 5/065 |
| | | | | 361/612 |
| 2015/0357801 | A1 | 12/2015 | Nakauchi et al. | |

FOREIGN PATENT DOCUMENTS

| | | |
|---|---|---|
| JP | 2-79711 A | 3/1990 |
| JP | 3-251014 A | 11/1991 |
| JP | 8-149667 A | 6/1996 |
| JP | 2004-129343 A | 4/2004 |
| JP | 2009-284651 A | 12/2009 |
| JP | 2010-207047 A | 9/2010 |
| WO | WO 2014/112123 A1 | 7/2014 |
| WO | WO 2015/198420 A1 | 12/2015 |

OTHER PUBLICATIONS

Extended European Search Report dated Sep. 15, 2017 in Patent Application No. 14885602.4.

* cited by examiner

GAS INSULATED SWITCHGEAR

FIELD

The present invention relates to a gas insulated switchgear that has a central conductor to which a high voltage is applied accommodated in a grounded tank, and that insulates the central conductor and the grounded tank from each other with an insulating gas filled in the grounded tank.

BACKGROUND

The insulating performance of a gas insulated switchgear is provided by accommodating a central conductor to which a high voltage is applied in a metallic grounded tank and filling an insulating gas in a space between the grounded tank and the central conductor. However, foreign matters (such as dust, fiber, or a conducting or semiconducting solid) may intrude into the grounded tank during manufacturing or an installation operation on site, which reduces the insulating performance. The intruded foreign matters are charged by an electric field generated at the time of energization and a receive electrostatic force in a direction to float up from an inner surface of the grounded tank. When the electrostatic force becomes larger than gravity acting on the foreign matters, the foreign matters float up and move toward the central conductor. The electric field concentrates around the foreign matters. Therefore, if the foreign matters approach the central conductor or adhere thereto, a high electric field is locally generated, which may reduce a voltage resistance performance of devices. Particularly in a case where the foreign matters are metallic and linear, the electric field concentrates intensively on ends of the foreign matters and thus the voltage resistance performance lowers greatly.

In order to handle this problem of metallic foreign matters, a conventional gas insulated switchgear described in Patent Literature 1, for example, has a non-linear resistance film having a non-linear resistance property on an inner surface of the tank to suppress partial discharge around metallic foreign matters to prevent charging of the metallic foreign matters and suppress floating-up of the metallic foreign matters.

CITATION LIST

Patent Literature

Patent Literature 1: Japanese Patent Application Laid-open No. 2010-207047 (FIG. 1)

SUMMARY

Technical Problem

However, in the conventional technique described in Patent Literature 1, the resistivity of the non-linear resistance film lowers at a stage where the electric field strength is small. Accordingly, even when partial discharge around metallic foreign matters can be suppressed, inflow of charges from the grounded tank to the metallic foreign matters becomes large and thus the foreign matters may be charged. Therefore, when an electrostatic force applied to the charges in the metallic foreign matters exceeds the gravity acting on the metallic foreign matters, the metallic foreign matters start floating up, which greatly lowers the insulating performance of the gas insulated switchgear.

The present invention has been achieved in view of the above problems, and an object of the present invention is to provide a gas insulated switchgear that can suppress partial discharge around metallic foreign matters and also can suppress inflow of charges from a grounded tank to metallic foreign matters.

Solution to Problem

In order to solve the problems and achieve the object, there is provided a gas insulated switchgear including: a grounded tank that is filled with an insulating gas; a central conductor that is provided inside the grounded tank and to which a voltage is applied; an insulating support member that is attached to the grounded tank and that supports the central conductor in an insulating manner; and a non-linear resistance part that is provided on an inner surface of the grounded tank on a lower side and that has a non-linear resistance material contained in an insulating material, wherein the non-linear resistance part contains a larger amount of the non-linear resistance material on a central conductor side than on a grounded tank side.

Advantageous Effects of Invention

According to the present invention, it is possible to suppress partial discharge around metallic foreign matters and also possible to suppress inflow of charges from a grounded tank to metallic foreign matters.

DESCRIPTION OF EMBODIMENTS

Exemplary embodiments of a gas insulated switchgear according to the present invention will be explained below in detail with reference to the accompanying drawings. The present invention is not limited to the embodiments.

First Embodiment

Figure 1:
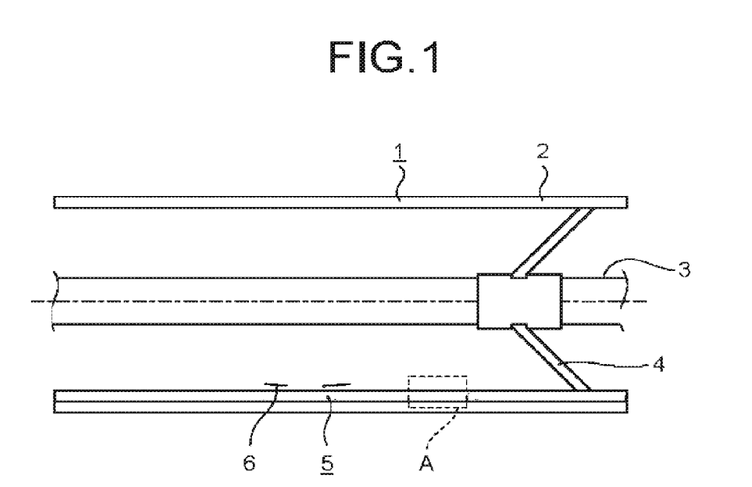
FIG. 1 is an axial sectional view of a gas insulated switchgear according to a first embodiment.
Figure 2:
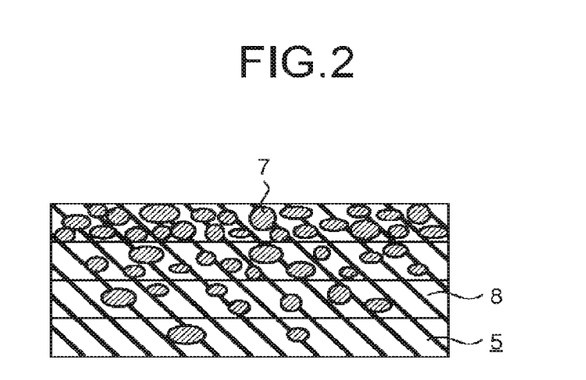
FIG. 2 is an enlarged view of a portion A illustrated in FIG. 1.

FIG. 1 is an axial sectional view of a gas insulated switchgear 1 according to the present invention, and FIG. 2 is an enlarged view of a portion A illustrated in FIG. 1. The gas insulated switchgear 1 has a cylindrical grounded tank 2 serving as a pressure vessel, a central conductor 3 that is provided inside the grounded tank 2 and to which a high voltage is applied, and an insulating support member 4 that is attached to the grounded tank 2 and that supports the central conductor 3 in an insulating manner. The central conductor 3 is fixed by the insulating support member 4 formed of a solid insulator at a position coaxial with the grounded tank 2. FIG. 1 illustrates a part of the gas insulated switchgear 1 and the gas insulated switchgear 1 generally has a configuration including devices such as a breaker, a disconnector, and an instrument current transformer as well as the constituent elements described above.

An insulating gas (not illustrated) for insulating the grounded tank 2 and the central conductor 3 from each other is filled therebetween. Single gas such as $SF_6$, dry air, $N_2$, $CO_2$, $O_2$, and $CF_3I$ is exemplified as the insulating gas. Alternatively, a mixture of two or more kinds of these gases can be used.

A non-linear resistance film 5 (non-linear resistance part) is provided on an inner surface of the grounded tank 2. The non-linear resistance film 5 is provided, for example, on the inner surface of the grounded tank 2 on a lower side. The non-linear resistance film 5 has a non-linear resistance material 7 (a silicon carbide, for example) contained in an insulating material 8 that has a resin as a primary component. The non-linear resistance material 7 has such a property that the resistance value is high in a low electric field region while the resistance value is low in a high electric field region. Materials having a non-linear resistance property other than a silicon carbide are, for example, a zinc oxide, a gallium nitride, and diamond. A thermoplastic resin and a thermosetting resin are considered as the insulating material. A vinyl chloride resin, a polyester resin, a nylon resin, or the like is used as the thermoplastic resin, and an epoxy resin, a urethane resin, an acrylic resin, or the like is used as the thermosetting resin. Formation methods of the non-linear resistance film 5 are brush coating, spray coating, electrostatic coating (providing static electricity to powder to cause the powder to adhere to a target object), and the like.

To enable the non-linear resistance film 5 to have the non-linear resistance property and prevent practical problems, the content rate of the non-linear resistance material 7 needs to be within a range of predetermined values. For example, when a silicon carbide is used as the non-linear resistance material 7, the filling rate thereof needs to be, for example, in a range from 30 to 80% in the volume fraction. The lower limit of these values is defined from an amount required for contacts between silicon carbides and the upper limit is defined from a condition on which the non-linear resistance film 5 does not become fragile. That is, the range of the predetermined values can be determined from a condition on which the non-linear resistance film 5 has the non-linear resistance property and the strength of the non-linear resistance film 5 is ensured.

Figure 3:
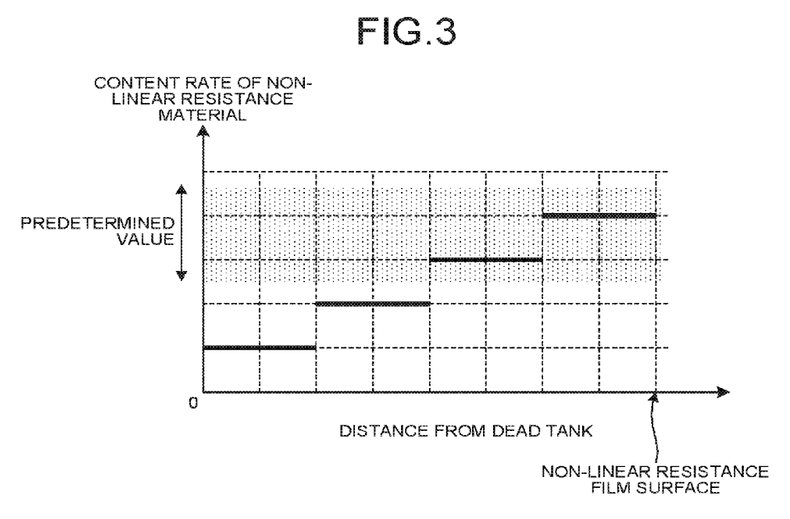
FIG. 3 is a diagram illustrating a content rate distribution of a non-linear resistance material in a thickness direction of a non-linear resistance film in the first embodiment.

FIG. 3 is a diagram illustrating a content rate distribution of the non-linear resistance material 7 in the thickness direction of the non-linear resistance film 5. As illustrated in FIG. 3, the non-linear resistance film 5 is formed to have the content rate of the non-linear resistance material 7 increasing from the side of the grounded tank 2 to the side of the central conductor 3. The content rate of the non-linear resistance material 7 at a portion facing the central conductor 3 in the non-linear resistance film 5 is set to fall within the range of the predetermined values described above. The content rate of the non-linear resistance material 7 at a portion near the grounded tank 2 in the non-linear resistance film 5 can be below the predetermined lower limit described above and almost entirety of the portion can be occupied by the insulating material 8.

An operation of the non-linear resistance film 5 according to the present embodiment is described next. It is assumed here that minute metallic foreign matters 6 intrude into the grounded tank 2 and are located on the non-linear resistance film 5 in FIG. 1.

Figure 4:
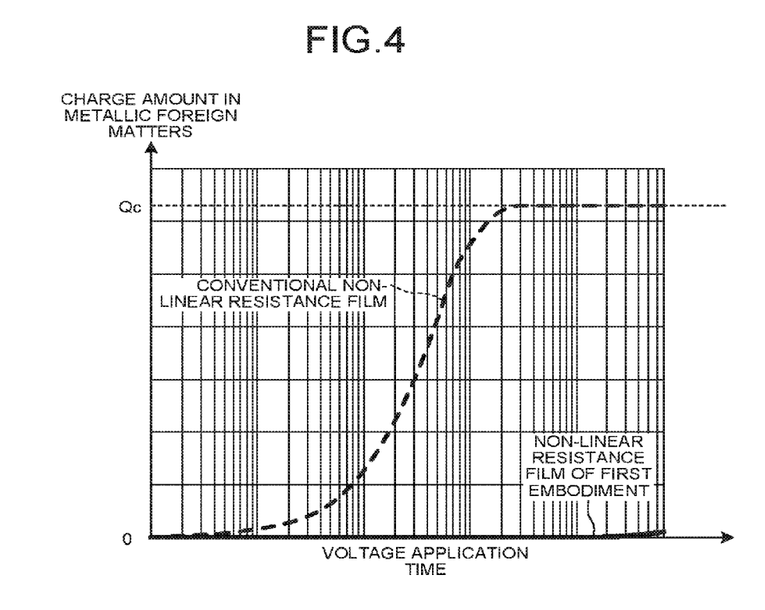
FIG. 4 is a diagram illustrating time dependencies of an amount of charges in metallic foreign matters in cases of a conventional non-linear resistance film described in Patent Literature 1 and the non-linear resistance film in the first embodiment.

FIG. 4 is a diagram illustrating time dependencies of the amount of charges in metallic foreign matters in cases of a conventional non-linear resistance film described in Patent Literature 1 and the non-linear resistance film in the present embodiment. In FIG. 4, the horizontal axis represents the voltage application time and the vertical axis represents the charge amount in metallic foreign matters. The horizontal axis is expressed by a logarithmic scale and $Q_c$ denotes an amount of charges that causes metallic foreign matters to float up. When the voltage applied to the central conductor 3 is low or when the electric field generated from the central conductor 3 is low, the non-linear resistance material 7 in the non-linear resistance film 5 functions as an insulator. As described above, the non-linear resistance material 7 alone is lower in the resistance value than the insulating material 8. However, because the ratio of the insulating material 8 at a portion near the grounded tank 2 is high, a high resistance value is obtained. Accordingly, inflow of charges from the grounded tank 2 to the metallic foreign matters 6 is blocked and the metallic foreign matters 6 are hardly charged with the non-linear resistance film 5 in the present embodiment even when the time passes as illustrated in FIG. 4. Therefore, in the present embodiment, an electric attractive force that is caused by the electric field generated from the central conductor 3 is larger than the own weight of the metallic foreign matters 6, and thus the metallic foreign matters 6 do not float up. In contrast thereto, with the conventional non-linear resistance film described in Patent Literature 1, the resistance of the non-linear resistance film uniformly lowers in the thickness direction. Therefore, charges flowing from the grounded tank 2 are accumulated in the metallic foreign matters 6 as the time passes, and the charge amount in the metallic foreign matters 6 approaches $Q_c$, so that the metallic foreign matters 6 float up.

Figure 5:
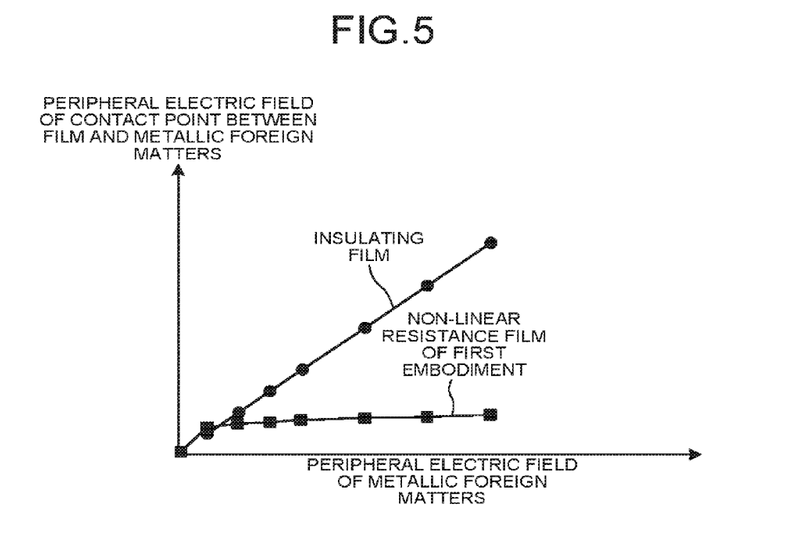
FIG. 5 is a diagram illustrating dependencies of a peripheral electric field of a contact point between metallic foreign matters and a film upon a peripheral electric field of metallic foreign matters in cases of a general insulating film and the non-linear resistance film in the first embodiment.

Meanwhile, when the voltage applied to the central conductor 3 is high or when the electric field generated from the central conductor 3 is high, the resistance value of the non-linear resistance material 7 in the non-linear resistance film 5 is low. Accordingly, a portion of the non-linear resistance film 5 near the central conductor 3 has a conductive property. FIG. 5 is a diagram illustrating dependencies of a peripheral electric field of a contact point between metallic foreign matters and a film upon a peripheral electric field of metallic foreign matters in cases of a general insulating film and the non-linear resistance film in the present embodiment. In FIG. 5, the horizontal axis represents the peripheral electric field of metallic foreign matters and the vertical axis represents the peripheral electric field of a contact point between the metallic foreign matters and the film. In this example, the peripheral electric field of the metallic foreign matters 6 is an electric field peripheral to the metallic foreign matters 6 on the side of the central conductor 3. When the voltage applied to the central conductor 3 is high or when the electric field generated from the central conductor 3 is high, electric field concentration around the contact point between the metallic foreign matters 6 and the non-linear resistance film 5 is reduced and partial discharge is less likely to occur as illustrated in FIG. 5. Even if partial discharge occurs, charges escape through a portion facing the central conductor 3 in the non-linear resistance film 5 and charging of the metallic foreign matters 6 is suppressed. On the other hand, a portion of the non-linear resistance film 5 near the grounded tank 2 has a high content rate of the insulating material 8 and thus has a high resistance value even when the electric field is high. Accordingly, charging of the metallic foreign matters 6 caused by movement of charges from the inner surface of the grounded tank 2 to the metallic foreign matters 6 is suppressed. In the present embodiment, an electric attractive force caused by the electric field generated from the central conductor 3 thus does not become larger than the own weight of the metallic foreign matters 6 and therefore the metallic foreign matters 6 do not float up. In contrast thereto, when an insulating film is provided on the inner surface of the grounded tank 2, electric concentration occurs around a contact point between the metallic foreign matters 6 and the non-linear resistance film 5, so that partial discharge is likely to occur.

A method is now described for forming the non-linear resistance film 5 to have the non-linear resistance material 7 whose content rate increases from the side of the grounded tank 2 to the side of the central conductor 3. As such a method, a method of performing coating plural times while gradually changing the ratio between the insulating material 8 and the non-linear resistance material 7 is considered, for example. That is, the insulating material 8 is an insulating coating material and the non-linear resistance film 5 is a coated film. It is assumed that a first layer formed on the inner surface of the grounded tank 2 includes almost only the insulating material 8. It is assumed that a second layer formed on the first layer includes a larger amount of the non-linear resistance material 7 than that of the first layer. Similarly, it is assumed that a third layer includes a larger amount of the non-linear resistance material 7 than that of the second layer. This processing is thereafter repeated to form the non-linear resistance film 5. However, the content rate of the non-linear resistance material 7 in a layer nearest to the high-voltage conductor is assumed to be within the range of the predetermined values described above. In this way, the non-linear resistance film 5 can be formed of plural layers formed by performing coating plural times while changing the content rate of the non-linear resistance material 7.

When the non-linear resistance film 5 is formed as described above, the ratio of the insulating material 8 having a high resistance value is higher and thus a higher resistance value can be maintained on the side near the grounded tank 2 than on the side near the central conductor 3. Accordingly, even when a high voltage is applied for a long time, inflow of charges from the grounded tank 2 to the metallic foreign matters 6 can be suppressed and charging of the metallic foreign matters 6 can be prevented to reduce behavior of the metallic foreign matters 6. Furthermore, because the content rate of the non-linear resistance material 7 on the side near the central conductor 3 is in the range of the predetermined values, the electric field near the metallic foreign matters 6 can be reduced by the non-linear resistance material 7 and occurrence of partial discharge can be suppressed.

In the gas insulated switchgear 1 according to the present embodiment, because the ratio of the non-linear resistance material 7 included in the non-linear resistance film 5 gradually increases from the side of the grounded tank 2 toward the side of the central conductor 3, a following effect is also achieved. That is, in a general gas insulated switchgear, a heat cycle in which a temperature increase and a temperature decrease are repeated occurs due to a temperature change in a peripheral environment and Joule heat generated at the time of energization. Therefore, stress acts on an interface between materials having different thermal expansion coefficients in a direction away from the interface, which may cause interface peeling. If the interface is peeled, partial discharge occurs on a peeled layer and insulating coating deteriorates due to discharge, which may lower the insulating function of the coating. However, in the present embodiment, the composition of the non-linear resistance film 5 gradually changes from a layer contacting the grounded tank 2 to a layer facing the central conductor 3. Therefore, a difference in thermal expansion coefficients between respective layers is small and interface peeling can be prevented.

Furthermore, a following effect is also achieved because the ratio of the non-linear resistance material 7 included in the non-linear resistance film 5 gradually increases from the side of the grounded tank 2 toward the side of the central conductor 3 in the gas insulated switchgear 1 according to the present embodiment. That is, normally, when the central conductor 3 is energized, current flows through the grounded tank 2 and the temperature of the grounded tank 2 increases. The temperature of the grounded tank 2 also increases due to sunlight to the grounded tank 2. When the non-linear resistance film is provided directly on the surface of the grounded tank as in the conventional technique described in the Patent Literature 1, the resistivity of the non-linear resistance material in the non-linear resistance film reduces due to an increase in the temperature. However, in the present embodiment, the layer contacting the grounded tank 2 is formed substantially of the insulating material 8 having a lower thermal conductivity than the non-linear resistance material 7. Therefore, even when the temperature of the grounded tank 2 increases, an increase in the temperature of the non-linear resistance material 7 is suppressed and a reduction in the resistivity of the non-linear resistance film 5 can be suppressed. The thermal conductivities of general non-linear resistance materials are 150 W/mK in the case of a silicon carbide, 25 W/mK in the case of a zinc oxide, 130 W/mK in the case of a gallium nitride, and 1000 W/mK in the case of diamond. The thermal conductivity of an epoxy resin as a general insulating material is 0.3 W/mK.

The content rate distribution of the non-linear resistance material 7 in the non-linear resistance film 5 can be optionally adjusted in the present embodiment. Therefore, the non-linear resistance film 5 can be adjusted to have a content rate distribution of the non-linear resistance material 7 that enables (1) to prevent the interface peeling, (2) to suppress inflow of current from the side of the grounded tank 2, and (3) to suppress also partial discharge around the metallic foreign matters 6. Once such a content rate distribution is found, this distribution can be reproduced with high accuracy.

Figure 6:
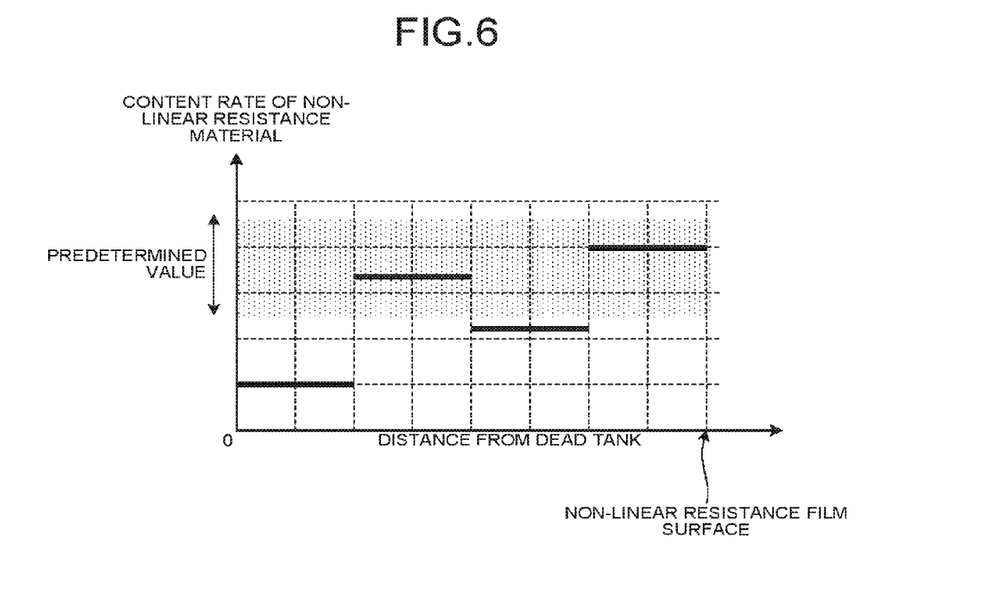
FIG. 6 is another diagram illustrating a content rate distribution of a non-linear resistance material in a thickness direction of a non-linear resistance film in the first embodiment.

While the non-linear resistance film 5 is formed to have the content rate of the non-linear resistance material 7 gradually increasing from the side of the grounded tank 2 toward the side of the central conductor 3 in the present embodiment, a portion in which the content rate of the non-linear resistance material 7 in an outer layer (on the side of the central conductor 3) of the non-linear resistance film 5 is lower than that in an inner layer (on the side of the grounded tank 2) can be included as illustrated in FIG. 6. However, because a difference in the content rate of the non-linear resistance material 7 between layers is larger in this case than in the case illustrated in FIG. 3, the effect to prevent interface peeling is reduced.

Associated with the above, a portion having a higher content rate of the non-linear resistance material 7 than that of a layer closest to the central conductor 3 (an outermost layer) can be located in an inner layer. However, the content rate of the non-linear resistance material 7 is assumed to be not above the predetermined upper limit in all layers from an innermost layer to the outermost layer.

Second Embodiment

In the first embodiment, the non-linear resistance film 5 that has a higher content rate of the non-linear resistance material 7 on the side of the central conductor 3 than on the side of the grounded tank 2 is obtained by performing coating plural times with the gradually changed content rate of the non-linear resistance material 7. A non-linear resistance sheet where content rates of the insulating material 8 and the non-linear resistance material 7 are changed in the thickness direction is provided on the inner surface of the grounded tank 2 in the present embodiment.

Figure 7:
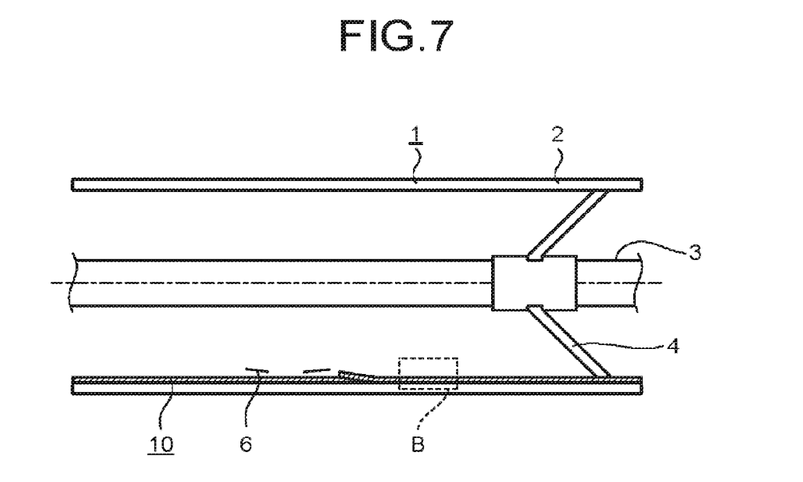
FIG. 7 is an axial sectional view of a gas insulated switchgear according to a second embodiment.
Figure 8:
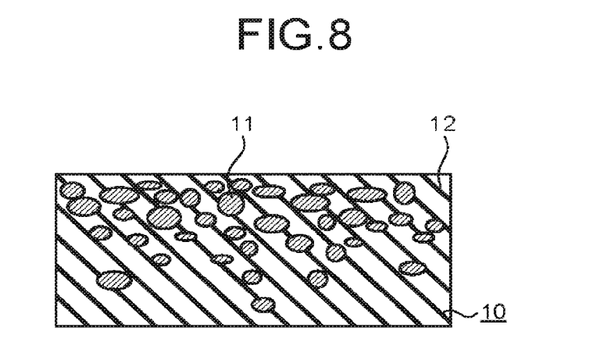
FIG. 8 is an enlarged view of a portion B illustrated in FIG. 7.
Figure 9:
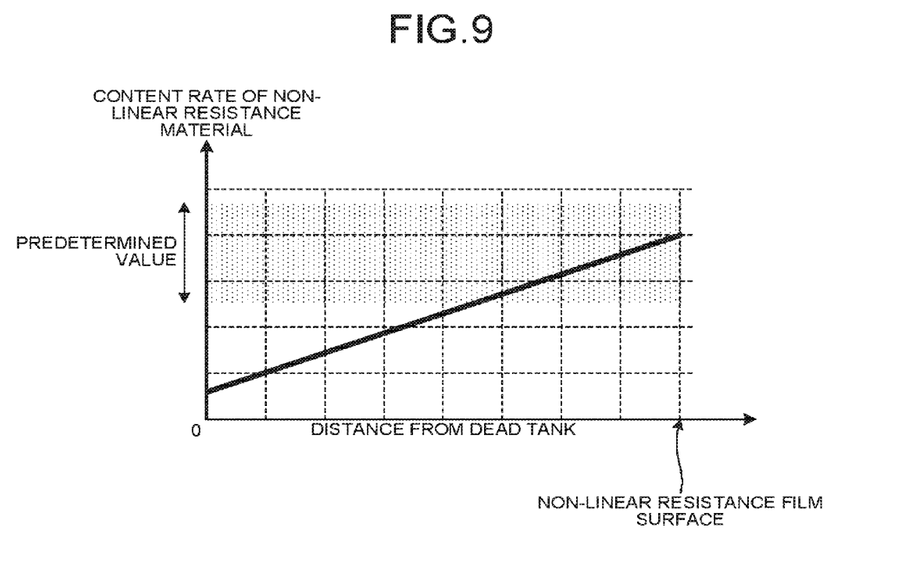
FIG. 9 is a diagram illustrating a content rate distribution of a non-linear resistance material in a thickness direction of a non-linear resistance film in the second embodiment.

FIG. 7 is an axial sectional view of the gas insulated switchgear 1 according to the present embodiment. FIG. 8 is an enlarged view of a portion B illustrated in FIG. 7. In FIGS. 7 and 8, constituent elements identical to those illustrated in FIGS. 1 and 2 are denoted by like reference signs and detailed descriptions thereof will be omitted. FIG. 9 is a diagram illustrating a content rate distribution of a non-linear resistance material in the thickness direction of a non-linear resistance film in the present embodiment.

A non-linear resistance sheet 10 is composed of an insulating material 12 and a non-linear resistance material 11. The content rate of the non-linear resistance material 11 differs in the thickness direction. The content rate of the non-linear resistance material 11 is low in a surface contacting the grounded tank 2 and the content rate of the non-linear resistance material 11 in a surface facing the central conductor 3 is high. While the content rate (filling rate) distribution of the non-linear resistance material 11 in the thickness direction of the non-linear resistance sheet 10 can increase monotonically as illustrated in FIG. 9, a portion in which the content rate of the non-linear resistance material 11 is lower on a side of the central conductor 3 (on an inner circumferential side) than on a side of the grounded tank 2 (on an outer circumferential side) may be included. The content rate of the non-linear resistance material 11 at a portion facing the central conductor 3 in the non-linear resistance sheet 10 is assumed to be in the range of the predetermined values described above.

As illustrated in FIG. 7, a plurality of non-linear resistance sheets 10 are laid in the entire grounded tank 2. The non-linear resistance sheets 10 are provided to be overlapped with adjacent non-linear resistance sheets 10 at the ends to prevent a portion not covered by the non-linear resistance sheets 10 from being exposed on the inner surface of the grounded tank 2.

A method is now described for manufacturing the non-linear resistance sheet 10 in which the content rate of the non-linear resistance material 11 in the thickness direction has the above distribution. As a method to provide the content rate of the non-linear resistance material 11 with the above distribution, a method of continuously changing a ratio between the insulating material 12 and the non-linear resistance material 11 using a centrifugal force is used, for example. When a centrifugal force is applied in a state where the non-linear resistance material 11 is added to the insulating material 12, a larger amount of the non-linear resistance material 11 is included in a portion farther from a rotation axis and a smaller amount of the non-linear resistance material 11 is included in a portion nearer the rotation axis, so that the content rate of the non-linear resistance material 11 is distributed continuously. A profile of the content rate distribution of the non-linear resistance material 11 can be adjusted, for example, according to the number of revolutions per unit time or the rotation time.

When the non-linear resistance sheets 10 as described above are used, the content rate of the insulating material 12 having a higher resistance value is higher and thus a higher resistance value can be maintained on the side near the grounded tank 2 than on the side near the central conductor 3. Therefore, even when a high voltage is applied for a long time, inflow of charges from the grounded tank 2 to the metallic foreign matters 6 can be suppressed and charging of the metallic foreign matters 6 can be prevented to reduce the behavior of the metallic foreign matters 6. Furthermore, because the content rate of the non-linear resistance material 11 on the side near the central conductor 3 is in the range of the predetermined values described above, the electric field around the metallic foreign matters 6 can be reduced by the non-linear resistance material 11 and accordingly occurrence of partial discharge can be suppressed.

While the content rate of the non-linear resistance material 7 in the non-linear resistance film 5 changes in a stepwise manner from the side of the grounded tank 2 toward the side of the central conductor 3 in the first embodiment, the content rate of the non-linear resistance material 11 changes continuously from the side of the grounded tank 2 to the side of the central conductor 3 in the present embodiment. Therefore, the effect to prevent interface peeling in the non-linear resistance sheets 10 is larger than that in the first embodiment.

While coating needs to be performed plural times to form the non-linear resistance film 5 in the first embodiment, placement of the finished non-linear resistance sheets 10 suffices in the present embodiment. Therefore, the formation time of the non-linear resistance part in the grounded tank 2 can be shortened.

Third Embodiment

In the first embodiment, the non-linear resistance film 5 having a lower content rate of the non-linear resistance material 7 on a side nearer the grounded tank 2 and a higher content rate of the non-linear resistance material 7 on a side nearer the central conductor 3 is obtained by performing coating plural times while gradually changing the content rate of the non-linear resistance material 7. In the present embodiment, the non-linear resistance film 5 having a lower content rate of the non-linear resistance material 7 on a side nearer the grounded tank 2 and a higher content rate of the non-linear resistance material on a side nearer the central conductor 3 as in the first embodiment is obtained using the non-linear resistance material 7 having a smaller specific gravity than the insulating material 8.

Figure 10:
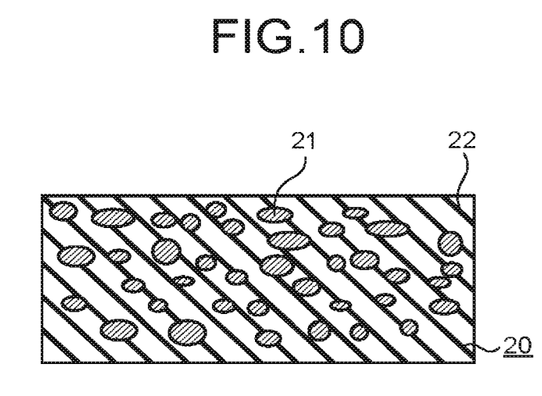
FIG. 10 is a sectional view of a non-linear resistance film according to a third embodiment immediately after coated on a grounded tank and before cured.
Figure 11:
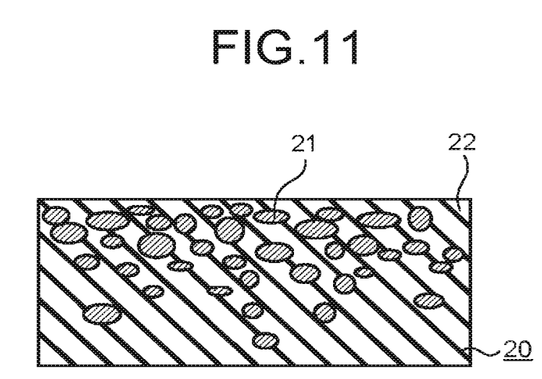
FIG. 11 is a sectional view of the non-linear resistance film according to the third embodiment after coated on the grounded tank and after cured.

FIG. 10 is a sectional view of a non-linear resistance film 20 immediately after coated on the grounded tank 2 and before cured, and FIG. 11 is a sectional view of the non-linear resistance film 20 after cured. While a non-linear resistance material 21 is distributed uniformly in the thickness direction of the non-linear resistance film 20 in FIG. 10, the present embodiment is not limited thereto. A combination of the non-linear resistance material 21 and an insulating material 22 is selected in such a manner that the specific gravity of the non-linear resistance material 21 is smaller than that of the insulating material 22. The specific gravities of general non-linear resistance materials are 3.22 g/cm$^3$ in the case of a silicon carbide, 5.6 g/cm$^3$ in the case of a zinc oxide, 6.1 g/cm$^3$ in the case of a gallium nitride, and 3.52 g/cm$^3$ in the case of diamond. The specific gravity of an epoxy resin generally used as the insulating material is 1 to 1.2 g/cm$^3$. Therefore, to apply the present embodiment, an insulating material having a larger specific gravity than the epoxy resin needs to be adopted. The curing condition needs to be adjusted to cause a content rate of the non-linear resistance material 21 at a portion facing the central conductor 3 in the non-linear resistance film 20 to fall within the range of the predetermined values described above.

When the non-linear resistance material 21 and the insulating material 22 are selected in this way, the non-linear resistance material 21 moves upward (to the side near the central conductor 3) and the insulating material 22 moves downward (to the side near the grounded tank 2) after coating and before completely cured. Therefore, the non-linear resistance film 20 having a lower content rate of the non-linear resistance material 21 on a side nearer the grounded tank 2 and a higher content rate of the non-linear resistance material 21 on a side nearer the central conductor 3 can be obtained similarly in the first and second embodiments.

When the non-linear resistance film 20 is formed as described above, the ratio of the insulating material 22 having a high resistance value is higher and thus a higher resistance value can be maintained on the side near the grounded tank 2 than on the side near the central conductor 3. Therefore, even when a high voltage is applied for a long time, inflow of charges from the grounded tank 2 to the metallic foreign matters 6 can be suppressed and charging of the metallic foreign matters 6 can be prevented to reduce the behavior of the metallic foreign matters 6. Furthermore, because the content rate of the non-linear resistance material 21 on the side near the central conductor 3 is in the range of the predetermined values as described above, the electric field around the metallic foreign matters 6 can be reduced and occurrence of partial discharge can be suppressed.

Because the method in the present embodiment can form the non-linear resistance film 20 at one time, the processing time and cost required for formation of the non-linear resistance film can be reduced compared to the method in the first embodiment.

While the content rate of the non-linear resistance material 7 in the non-linear resistance film 5 changes in a stepwise manner from the side of the grounded tank 2 to the side of the central conductor 3 in the first embodiment, the content rate of the non-linear resistance material 21 changes continuously from the side of the grounded tank 2 to the side of the central conductor 3 in the present embodiment. Therefore, the effect to prevent interface peeling is larger than that in the first embodiment.

Fourth Embodiment

While one kind of non-linear resistance material is used in the first to third embodiments, two layers of non-linear resistance films can be formed using two kinds of non-linear resistance materials having different electric field strengths at which the resistivity changes.

Figure 12:
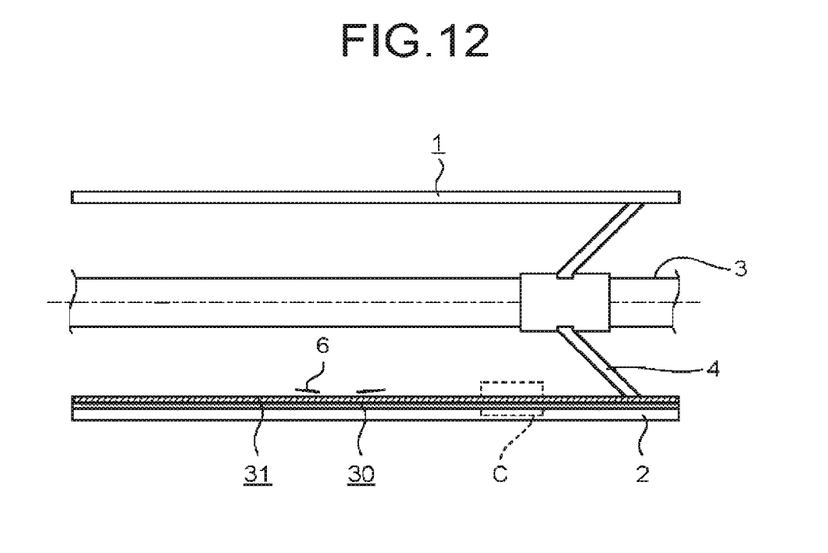
FIG. 12 is an axial sectional view of a gas insulated switchgear according to a fourth embodiment.
Figure 13:
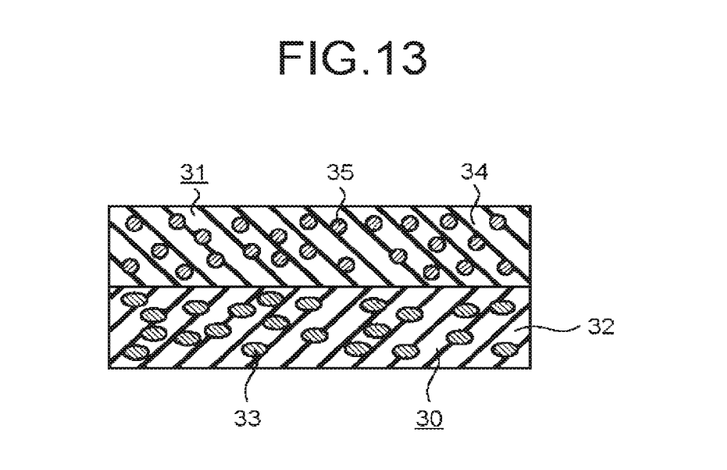
FIG. 13 is an enlarged view of a portion C illustrated in FIG. 12.

FIG. 12 is an axial sectional view of the gas insulated switchgear 1 according to the present embodiment, and FIG. 13 is an enlarged view of a portion C illustrated in FIG. 12. In FIGS. 12 and 13, constituent elements identical to those illustrated in FIGS. 1 and 2 are denoted by like reference signs and detailed descriptions thereof will be omitted.

A first non-linear resistance film 30 (first non-linear resistance part) having a first non-linear resistance material 33 contained in a first insulating material 32 is provided on the inner surface of the grounded tank 2. A second non-linear resistance film 31 (second non-linear resistance part) having a second non-linear resistance material 35 contained in a second insulating material 34 is provided on the surface of the first non-linear resistance film 30. The first insulating material 32 and the second insulating material 34 can be the same or different. However, adhesiveness between the first non-linear resistance film 30 and the second non-linear resistance film 31 is higher in a case where the first insulating material 32 and the second insulating material 34 are the same.

Figure 14:
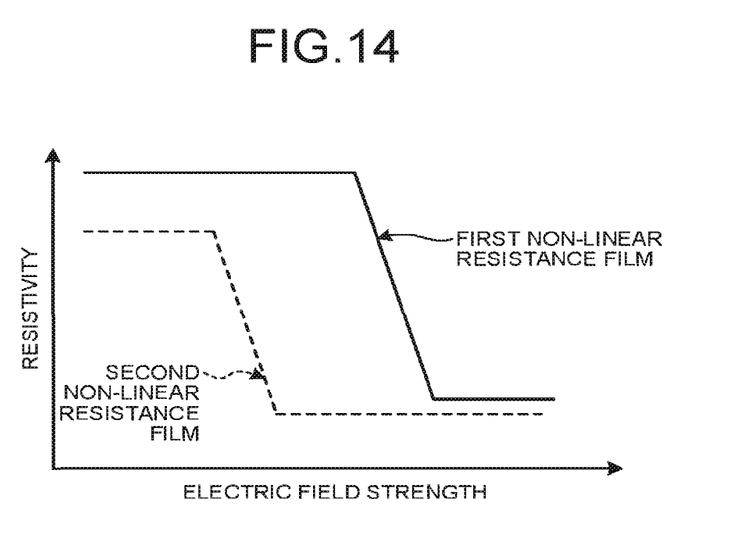
FIG. 14 is an explanatory diagram of non-linear resistance properties of a first non-linear resistance film and a second non-linear resistance film.

Non-linear resistance properties of the first non-linear resistance film 30 and the second non-linear resistance film 31 are as illustrated in FIG. 14 and an electric field strength at which the resistivity changes in the first non-linear resistance film 30 is set to be higher than that of the second non-linear resistance film 31. That is, an electric field strength at which the resistivity changes in the first non-linear resistance material 33 is set to be higher than that of the second non-linear resistance material 35 and the resistivity of the first non-linear resistance film 30 lowers in a higher electric field region than in the second non-linear resistance film 31. An electric field strength at which the resistivity changes (lowers) is an electric field strength at which the non-linear resistance film changes from insulating to conducting. The content rate of the first non-linear resistance material 33 in the first insulating material 32 is, for example, equal to that of the second non-linear resistance material 35 in the second insulating material 34.

In a low electric field region before the resistivity changes (lowers), the resistivity of the first non-linear resistance film 30 is preferably equivalent to or higher than that of the second non-linear resistance film 31. That is, it is preferable that the resistivity of the first non-linear resistance film 30 in an electric field region lower than the electric field strength at which the own resistivity changes (lowers) is set to be equivalent to or higher than that of the second non-linear resistance film 31 in an electric field region lower than the electric field strength at which the own resistivity changes (lowers).

When the first non-linear resistance film 30 and the second non-linear resistance film 31 are formed in this way, the resistivity of only the second non-linear resistance film 31 lowers at a stage where the electric field strength around the metallic foreign matters 6 is low and charges can be escaped toward the surface of the second non-linear resistance film 31 to suppress charging of the metallic foreign matters 6. Because the first non-linear resistance film 30 maintains a high resistivity in this case, inflow of charges from the grounded tank 2 to the metallic foreign matters 6 can be suppressed.

When the first non-linear resistance film 30 and the second non-linear resistance film 31 are formed in this way, partial discharge around the metallic foreign matters 6 can be suppressed and also inflow of charges from the grounded tank 2 to the metallic foreign matters 6 can be suppressed to prevent charging of the metallic foreign matters 6.

Furthermore, the electric field regions having the non-linear resistance property are shifted between the first non-linear resistance film 30 and the second non-linear resistance film 31, so that the non-linear resistance property is provided in a wide region. Accordingly, variation in the film thickness can be accepted more than in the conventional technique.

In the present embodiment, the configuration in which two layers of non-linear resistance films using two kinds of non-linear resistance materials having different electric field strengths at which the resistivity changes are formed has been described. However, a configuration in which n layers of non-linear resistance films using n kinds of non-linear resistance materials having different electric field strengths at which the resistivity changes are formed is also possible. In this configuration, n is an integer equal to or larger than 3. That is, first to nth non-linear resistance films are stacked on the inner surface of the grounded tank 2 one on top of another and an ith non-linear resistance film is formed to have an ith non-linear resistance material contained in an ith insulating material. In this configuration, i is any integer meeting $1 \leq i \leq n$. The ith non-linear resistance material has an electric field strength at which the resistivity changes higher than that of an (i+1)th non-linear resistance material, and the ith non-linear resistance film has the resistivity that lowers in a higher electric field region than the (i+1)th non-linear resistance film. It is preferable that the resistivity of the ith non-linear resistance film is set to be equivalent to or higher than that of the (i+1)th non-linear resistance film in a low electric field region before the resistivity changes (lowers). That is, the resistivity of the ith non-linear resistance film in an electric field region lower than an electric field strength at which the own resistivity changes (lowers) is preferably equivalent to or higher than that of the (i+1)th non-linear resistance film in an electric field region lower than an electric field strength at which the own resistivity changes (lowers). Other points are the same as those in the configuration described above in which two layers of non-linear resistance films are formed.

While the gas insulated switchgear has been described as an example in the first to fourth embodiments, the first to fourth embodiments can be applied to a gas insulated device including a grounded tank filled with an insulating gas, a central conductor that is provided inside the grounded tank and to which a voltage is applied, and an insulating support member that is attached to the grounded tank and that supports the central conductor in an insulating manner. That is, the above descriptions similarly hold true for the gas insulated device instead of the gas insulated switchgear.

INDUSTRIAL APPLICABILITY

The present invention is useful as a gas insulated switchgear.

REFERENCE SIGNS LIST

1 gas insulated switchgear, 2 grounded tank, 3 central conductor, 4 insulating support member, 5, 20 non-linear resistance film, 6 metallic foreign matter, 7, 11, 21 non-linear resistance material, 8, 12, 22 insulating material, 10 non-linear resistance sheet, 30 first non-linear resistance film, 31 second non-linear resistance film, 32 first insulating material, 33 first non-linear resistance material, 34 second insulating material, 35 second non-linear resistance material.

The invention claimed is:

1. A gas insulated switchgear comprising:
    a grounded tank that is filled with an insulating gas;
    a central conductor that is provided inside the grounded tank and to which a voltage is applied;
    an insulating support member that is attached to the grounded tank and that supports the central conductor in an insulating manner; and
    a non-linear resistance part that is provided on an inner surface of the grounded tank on a lower side and that has a non-linear resistance material contained in an insulating material, wherein
    the non-linear resistance part has a first content rate of the non-linear resistance material on a grounded tank side and a second content rate of the non-linear resistance material on a central conductor side, the first content rate being greater than zero, and the second content rate being greater than the first content rate.

2. The gas insulated switchgear according to claim 1, wherein the second content rate of the non-linear resistance material on the central conductor side is within a range determined based on a condition on which the non-linear resistance part has a non-linear resistance property and a strength of the non-linear resistance part is ensured.

3. The gas insulated switchgear according to claim 1, wherein the non-linear resistance part is a coated film having the non-linear resistance material contained in an insulating coating material as the insulating material.

4. The gas insulated switchgear according to claim 3, wherein the coated film includes a plurality of layers formed by plural times of coating with changed content rates of the non-linear resistance material.

5. The gas insulated switchgear according to claim 4, wherein a content rate of the non-linear resistance material increases in a stepwise manner from the grounded tank side to the central conductor side.

6. The gas insulated switchgear according to claim 3, wherein a content rate of the non-linear resistance material increases continuously from the grounded tank side to the central conductor side.

7. The gas insulated switchgear according to claim 3, wherein a thermal conductivity of the non-linear resistance material is higher than that of the insulating material.

8. The gas insulated switchgear according to claim 1, wherein the non-linear resistance part is a non-linear resistance sheet having the non-linear resistance material contained in an insulating coating material as the insulating material.

9. The gas insulated switchgear according to claim 8, wherein a content rate of the non-linear resistance material increases continuously from the grounded tank side to the central conductor side.

10. The gas insulated switchgear according to claim 8, wherein a thermal conductivity of the non-linear resistance material is higher than that of the insulating material.

11. A gas insulated switchgear comprising:
    a grounded tank that is filled with an insulating gas;
    a central conductor that is provided inside the grounded tank and to which a voltage is applied;
    an insulating support member that is attached to the grounded tank and that supports the central conductor in an insulating manner;
    a first non-linear resistance part that is provided on an inner surface of the grounded tank on a lower side and that has a first non-linear resistance material contained in a first insulating material; and a second non-linear resistance part that is provided on a surface of the first non-linear resistance part and that has a second non-linear resistance material contained in a second insulating material, wherein the first non-linear resistance part is configured to change a resistivity state thereof at a first electric field strength, the second non-linear resistance part is configured to change a resistivity state thereof at a second electric field strength that is lower than the first electric field strength, the first non-linear resistance part has a first resistivity at an electric field strength that is less than the second electric field strength, and the second non-linear resistance part has a second resistivity less than the first resistivity at the electric field strength.

* * * * *